(12) United States Patent
Fehr et al.

(10) Patent No.: US 6,907,328 B2
(45) Date of Patent: Jun. 14, 2005

(54) SWITCH APPARATUS FOR A DRIVER INFORMATION INTERFACE

(75) Inventors: Walton Fehr, Mundelein, IL (US); Jeffrey C. Pflug, Winfield, IL (US); Kenneth W. Stanevich, Sycamore, IL (US)

(73) Assignee: Motorola, Inc., Schaumburg, IL (US)

( * ) Notice: Subject to any disclaimer, the term of this patent is extended or adjusted under 35 U.S.C. 154(b) by 43 days.

(21) Appl. No.: 10/458,295

(22) Filed: Jun. 10, 2003

(65) Prior Publication Data

US 2005/0004724 A1 Jan. 6, 2005

(51) Int. Cl.⁷ ................................................ H01H 9/00
(52) U.S. Cl. ..................... 701/29; 200/61.54; 200/339; 74/552; 280/731
(58) Field of Search ................. 200/61.54, 61.57, 200/61.55, 6 R, 315, 339; 180/333, 78; 307/10.2; 280/731, 728.3, 728.2; 74/552, 558.5; 701/29; 702/29, 30, 33, 34, 43, 31, 35, 101; 340/825.54, 825.52, 426, 438

(56) References Cited

U.S. PATENT DOCUMENTS

| | | | | |
|---|---|---|---|---|
| 5,615,910 A | * | 4/1997 | Margetak et al. | 280/731 |
| 6,396,011 B1 | * | 5/2002 | Glowczewski et al. | 200/61.54 |
| 6,525,283 B2 | * | 2/2003 | Leng | 200/339 |
| 2002/0067078 A1 | * | 6/2002 | Hogarth | 307/10.2 |
| 2002/0153234 A1 | * | 10/2002 | Durocher | 200/61.54 |
| 2002/0195325 A1 | * | 12/2002 | Hotvet et al. | 200/61.54 |
| 2002/0195799 A1 | * | 12/2002 | Simon et al. | 280/728.3 |
| 2004/0173047 A1 | * | 9/2004 | Xu et al. | 74/552 |

* cited by examiner

Primary Examiner—Richard M. Camby
Assistant Examiner—Tuan C To

(57) ABSTRACT

An interface includes a base with locking flanges for securing the base to a second structure within a vehicle. A plurality of switch caps are pivotably supported on the base and extend through apertures formed in the base. Each switch cap has a first surface and a second surface such that pressure applied to one of the first surface and the second surface causes limited rocking motion of the switch cap and actuation of a corresponding momentary contact switch.

20 Claims, 3 Drawing Sheets

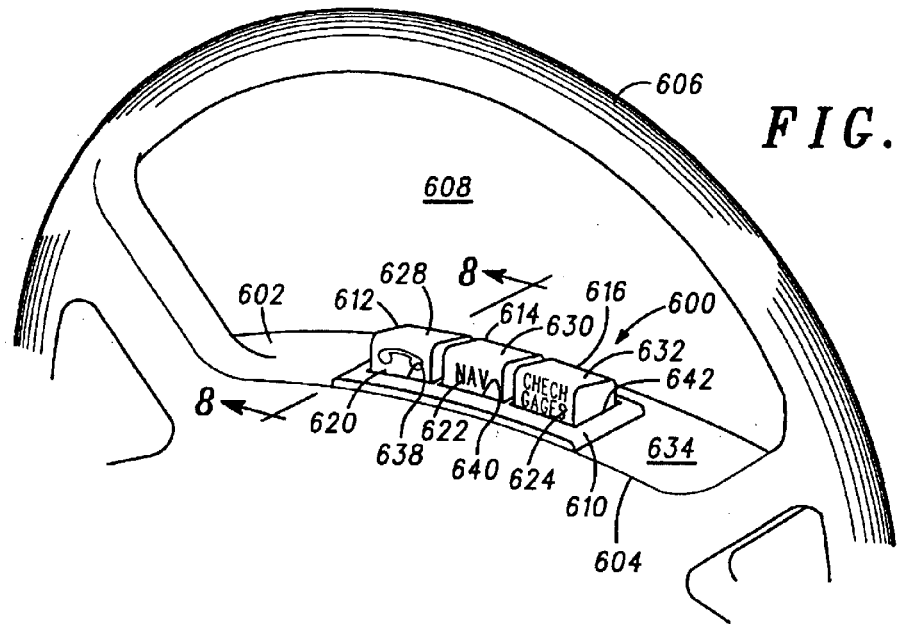
FIG. 6
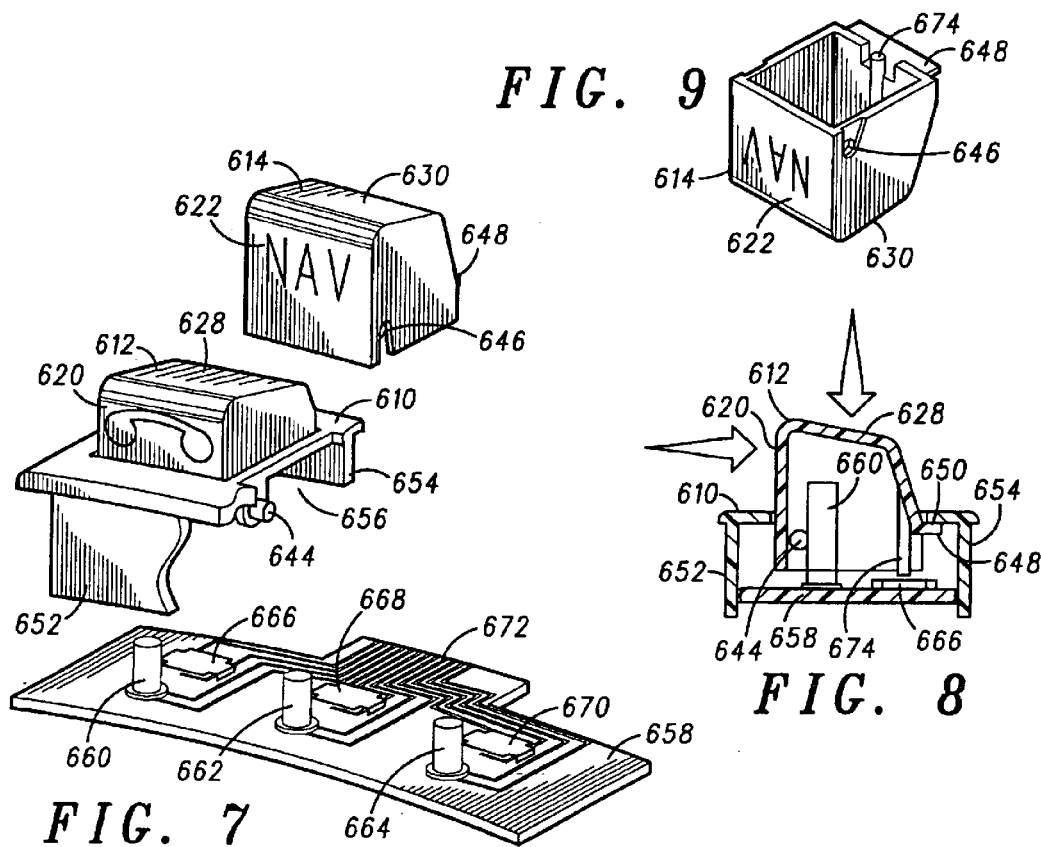
FIG. 9
FIG. 7
FIG. 8

US 6,907,328 B2

SWITCH APPARATUS FOR A DRIVER INFORMATION INTERFACE

CROSS-REFERENCE TO RELATED APPLICATIONS

This patent is related to the following commonly assigned United States patent application: "Driver Information Interface and Method of Managing Driver Information" Ser. No. 10/164,499, the disclosure of which is hereby expressly incorporated herein by reference.

TECHNICAL FIELD

This patent relates to information management systems and more particularly in exemplary embodiments to a switch apparatus for a driver information interface.

BACKGROUND

The proliferation of communication devices has created a cacophony of bells, whistles, vibrations and other audible and haptic alerts which signal the presence or availability of information at the device. Such alerts may be irritating to the user and others, such as an untimely device alert in a theatre. These alerts may create distractions leading to a loss of concentration in safety-critical situations, such as during a critical driving task.

Each communication device, a user may have several separate devices or an integrated device facilitating a number of communication services, may provide its own alert. Additionally, a vehicle receives information from various vehicle systems relating to its operation and may also receive information from other vehicle-related systems such as a navigation system, an entertainment system and the like. The alerts, communications, annunciations and indications of these systems and devices, in whatever form they may be, are activated based upon the state of the associated system and not in relationship to the activity of the user or the condition of any other device or system. For example, navigation systems present information to the user/driver in synchronization to the position of the vehicle, but not in relation to the driver's attention. The driver may be focused on a particular task and miss some or all of the information provided by the navigation system.

The commonly assigned United States patent application "Method and Response Synthesis in a Driver Assistance System," Ser. No. 09/976,560, the disclosure of which is hereby expressly incorporated herein by reference, describes a system for managing information arriving to the vehicle operator based upon the existing operating conditions of the vehicle and the condition of the driver. For example, the system may inhibit or otherwise manage an incoming voice communication if at the time the incoming communication is received the vehicle operator is engaged in a safety-critical driving task.

Too often, information is received simultaneously with other information or while one is attending to a demanding task. Thus, there remains a need for an interface that allows the user to act on the existence of the information.

BRIEF DESCRIPTION OF THE DRAWINGS

FIG. 6 is a partial perspective view of an exemplary embodiment of a switch apparatus for a driver information interface.

FIG. 7 is an exploded assembly view of the switch apparatus illustrated in FIG. 6.

FIG. 8 is a cross section view taken along line 8—8 of FIG. 6.

FIG. 9 is a bottom view of a switch cap of the switch apparatus illustrated in FIGS. 6–9.

DETAILED DESCRIPTION

An interface allows a user to choose when incoming information is received. Thus, the user may choose to receive particular types of information according to a current need for the information and when appropriate attention may be given to the information. This alleviates the potential for information arriving simultaneously with other information or while the user is engaged in an activity requiring particular attention. Thus, the possibility of some or all of the information being missed and/or confused is reduced. The interface identifies for the user at least the type of information to be received and a criticality and/or time-sensitivity of that information. Embodiments are described wherein the interface and method are used in connection with a vehicle and a vehicle operator. Additional embodiments are described in other contexts. Still other applications will be appreciated by those of skill in the art.

The vehicle may have a steering wheel with a hub, a rim and a plurality of spokes, wherein the hub, rim and at least a portion of the plurality of spokes define an opening facilitating viewing of an instrument cluster disposed within the vehicle by the driver. The interface may be mounted such that information indicators associated with the interface extend into the opening, and are thus within the driver's primary line of sight while operating the vehicle. This location of the interface also permits the driver to engage the interface while maintaining contact with the steering wheel.

Figure 1:
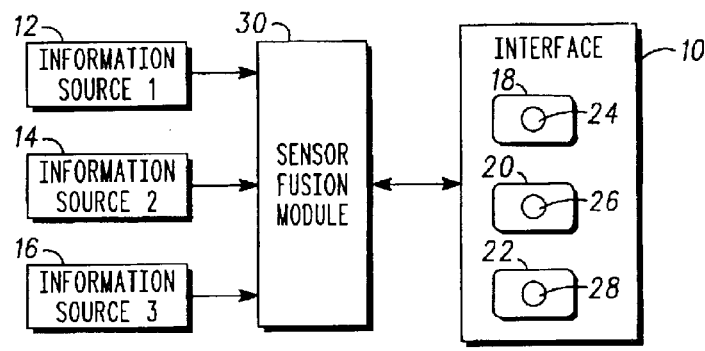
FIG. 1 is a block diagram illustrating an exemplary embodiment of a system incorporating a user interface.

FIG. 1 illustrates in block diagram form an interface 10 coupled to a receive information from a plurality of information sources, respectively indicated as first information source 12, second information source 14 and third information source 16. By way of example, and not limitation, the interface 10 may be disposed within a vehicle and the first information source 12 may be vehicle related information received from the various systems and controllers located within the vehicle, the second information source 14 may be voice and/or data information such as a voice call, an email message, a page message, a short text message, web content and other such information received via a wireless communication system such as a cellular communication system, and the third information source 16 may be navigation data received from a navigation system operating in conjunction with the operation of the vehicle.

The interface 10 includes, for each of the first, second and third information sources 12–16 a button, respectively buttons 18–22 and a visual indicator, respectively indicators 24–28. The interface 10 may have other forms, for example, the interface 10 may include a touch screen display and the buttons and indicators are appropriately indicated regions of the touch screen display. Each indicator 24–28 may have one of a plurality of states, e.g., inactive, steadily indicated or flashed. Alternatively, the indicator may indicate one of a plurality of colors, e.g., green, red and yellow. Still further states may be derived and indicated by the indicators 24–28 by combining the animated states of the indicator, i.e., inactive, steadily indicated or flashed, with colors.

The interface 10 may be coupled directly to the sources of information, and therefore, the interface 10 may contain a processor, memory and control program for carrying out its operation described herein. Alternatively, as shown in FIG. 1, the interface 10 may be coupled to the sources of information 12–16 via a sensor fusion module 30. In yet a further alternative arrangement, the interface 10 may incorporate the functionality of a sensor fusion module. A sensor fusion module suitable for use in connection with the interface 10 is described in the afore-mentioned patent application "Method and Response Synthesis in a Driver Assistance System," Ser. No. 09/976,560.

The state of the indicator informs the user as to the availability of information relating to the associated system. In one embodiment, if the indicator is inactive (off) means there is no incoming information at the present time or previous incoming information is no longer relevant. If the indicator is in a steadily indicated state (on but not flashing), there is incoming information, but the incoming information does not require immediate attention. If the indicator is in a flashed state (flashing on and off), there is present real-time information to which a response is necessary. These states may be understood by considering the following illustrative examples.

First information source 12 may relate to the vehicle operation or condition. An inactive indicator in this instance indicates that there is no information relative to the vehicle's features or condition or the driver's present driving behavior available. A steadily lighted state indicates non-safety critical information about the vehicle or the driver's behavior is available. Such information may include, but is not limited to, needed vehicle service, available vehicle features, or hints to the driver about the consequences of current driver behavior. Such information is not time-sensitive or urgent. A flashed state indicates non-safety critical information about the vehicle, vehicle features, or driver's behavior, which is time-sensitive, is available. If, for example, a situation in the previous condition becomes more urgent, the indicator would change from a steady indicated state to a flashing state. If the information in the flashing mode becomes safety critical, it would be presented via a warning system rather than through this information system. Throughout the preceding description, the "non-safety critical" nature of the information being processed has been emphasized. This is based on the assumption that warnings of imminent danger should be presented as soon as possible by whatever means available to the driver in order to provide adequate reaction time to avoid the danger. In other words, there should be no delay while the system waits for the driver to recognize that there is a warning waiting and to activate it. Thus, the interface and method described herein is not a warning system but an information management system.

Second information source 14 may relate to voice, data, web content, or other wireless communication data. When this indicator is inactive it means that there is no incoming information or message, neither real-time nor in data storage (such as voice mail). There is information available, but no one is waiting for a response and the information (or message) is not time-sensitive. Alternatively, the steadily indicated state may be activated if a flashing indicator receives no response and the time-sensitivity is no longer operative (such as when a call is not answered and a voice mail message is left). The indicator flashes when a message is marked "urgent" by its sender, when the sender has been previously identified by the system user as a source of priority messages, or when the caller is on-line real-time awaiting a response. As noted, if a caller leaves a voice mail (that is not marked urgent) the flashing indicator reverts to a steady, non-flashing indication.

Whether information is response-necessary or time-sensitive is subjective and may differ by user. For example, the received information may indicate that there is an incoming phone call and that the calling party is waiting for a response. Or, as suggested above, certain callers may be given priority, and hence incoming messages from those callers result in a flashing indication. Preferences may be retained within a memory (not depicted) within the interface 10, or may be loaded into the interface 10 during usage of the vehicle or device to which it is associated. A system and method for transporting personal preferences is described in the commonly assigned U.S. patent application "Context Aware Wireless Communication Device and Method," Ser. No. 09/976,974, the disclosure of which is hereby expressly incorporated herein by reference.

Third information source 16 may relate to a navigation or real-time traffic information system. An inactive indicator here indicates either that there is no destination entered into the route guidance system or that there is no upcoming navigation maneuver in some number of minutes (either determined by the system or set by user preference) minutes or kilometers. Alternately, when a flashing indication is ignored for a period of time and no further alternatives are available, the indicator will be deactivated, since it would only be a nuisance to a driver who may be stuck in a traffic jam. When the indicator is steadily indicated there is an upcoming navigation maneuver within a range of minutes or kilometers for which the vehicle is in correct lane position and is within appropriate operating parameters. Or there is real-time traffic information about the driver's chosen route that may require a discretionary change of route. When the indicator is flashing, quick response within some minutes or kilometers is needed from the driver or the safe execution of the maneuver is in doubt. If the flashing indicator is ignored and the maneuver is missed, the flashing light will be extinguished until the route guidance system has recalculated the route and is ready to present the new instructions. Alternately, a flashing indicator might mean that the vehicle is rapidly enough approaching blocked traffic that alternate routes are quickly being eliminated.

To access the available information, as indicated by the state of the indicator, the user actuates the associated button. The interface 10 enables the associated information source to provide the requested information in the manner in which the information source would otherwise have provided the information. For example, a voice alert may be given of an upcoming navigation maneuver, a voice call may be communicated via a hands free phone system, or a message indicator may illuminate indicating the status of a vehicle system.

Once the message has been received, the user may want to instruct the system regarding that message and/or information. For example, the user may wish to retain the information as fresh, save the information, respond to the information or delete it. The user may additionally wish to move on to a next message from the currently active information source or from another information source. The user may manipulate the information using the controls of the information source, or the interface 10 may be configured to accept voice input. The voice input may be activated automatically upon pressing the button for receiving the information.

Because operating a vehicle is a dynamic activity, conditions may change suddenly as the operator is receiving information from one of the information sources. The aforementioned U.S. patent application "Method and Response Synthesis in a Driver Assistance System," Ser. No. 09/976, 560 describes a process for suspending or terminating information delivery should the operator's cognitive load exceed a threshold. Interface 10 may be adapted to operate in accordance with the system or method therein described and/or the interface 10 may be adapted to operate in conjunction with such a system or method.

Since a vehicle is often shared by multiple drivers, it may be necessary for the interface 10 to recognize the current operator. As mentioned, U.S. patent application "Context Aware Wireless Communication Device and Method," Ser. No. 09/976,974 describes a system for identifying an operator as well for retrieving preferences for the current operator. Included in such a system, and in connection with the operation of the interface 10, the user may be prompted to provide a password. The password may be a coded sequence of presses of the buttons 18–22, a voice command and/or a combination of such techniques for accepting password data from the operator.

Figure 2:
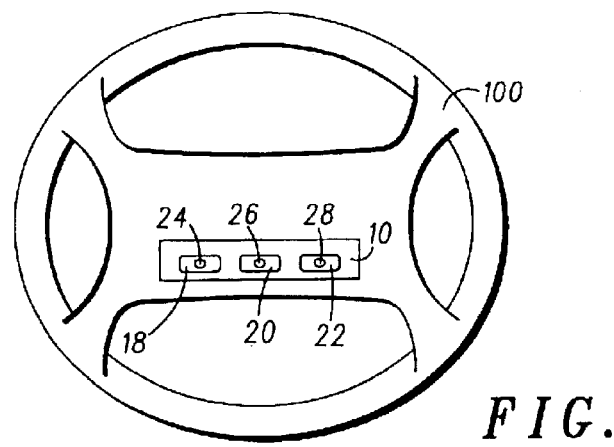
FIG. 2 is a graphic illustration of an exemplary embodiment of an interface.
Figure 3:
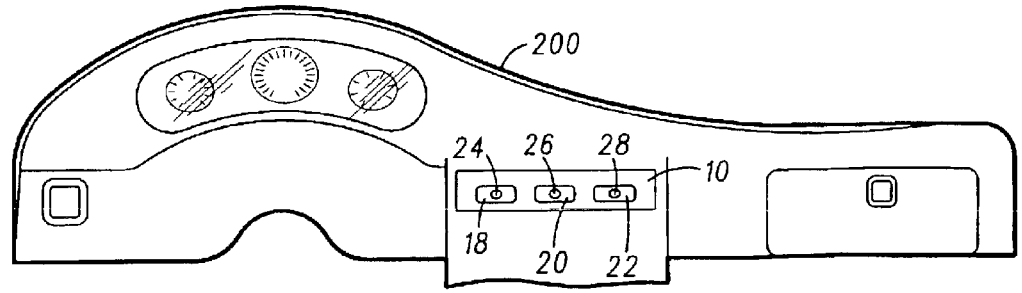
FIG. 3 is a graphic illustration of an alternate exemplary embodiment of an interface.

FIG. 2 illustrates graphically a steering wheel 100 of a vehicle (not depicted) including an interface 10. In such an arrangement, the interface 10 is conveniently located within the operator's sight and reach. FIG. 3 illustrates an instrument panel 110 of a vehicle (not depicted) including the interface 10. Again, the interface 10 is conveniently located relative to the operator's sight and reach. In yet another alternative arrangement, the indicators may be depicted within a heads-up display projected on the vehicle windshield. The buttons 18–22, which may still include indicators 24–28, may be located on the steering wheel 100, the instrument panel 110 or at another location convenient to the operator.

Figure 4:
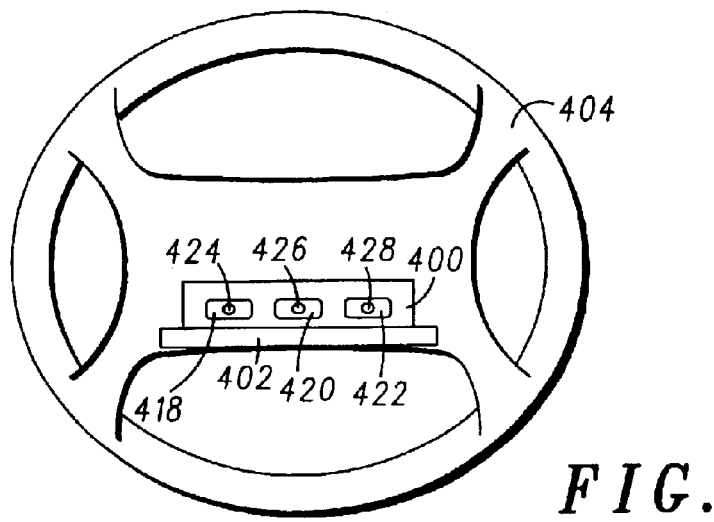
FIG. 4 is a graphic illustration of an alternate exemplary embodiment of an interface.

FIG. 4 illustrates an interface 400 that may be adapted to a vehicle. The interface 400 includes, for each of first, second and third information sources a button, respectively buttons 418–422 and a visual indicator, respectively indicators 424–428. The interface 400 is adapted to engage a docking station 402 secured to a steering wheel 404 of the vehicle and coupled to one or more information sources within the vehicle. Of course the docking station 402 could be secured at other locations within the vehicle. The interface 400 may therefore be configured with a particular operator's preferences, which may not only govern operation of the interface 400 itself, but also its interaction with the information sources.

Further to the embodiment shown in FIG. 4, the interface 400 may be configured as part of a cellular telephone, a pager, a personal digital assistant or other portable device. In that regard, the interface 400 may be adapted to operate in conjunction with vehicle systems when engaged with docking station 402 within the vehicle, and may remain operable in a standalone mode when undocked. The buttons and indicators may be configurable based upon the docked or undocked state of the device. For example, when docked, the button 418 and indicator 424 may be associated with vehicle operation information, whereas when undocked, the button 418 and indicator 426 may be automatically reconfigured to accept input from another information source. Button 420 and indicator 426 may still be associated with incoming voice, data or other content and button 422 and indicator 428 may be associated with a personal navigation system apart from the vehicle. Thus, it will be appreciated that the interface 400 is not limited to in-vehicle operation, but remains functional in either a docked or undocked state.

Figure 5:
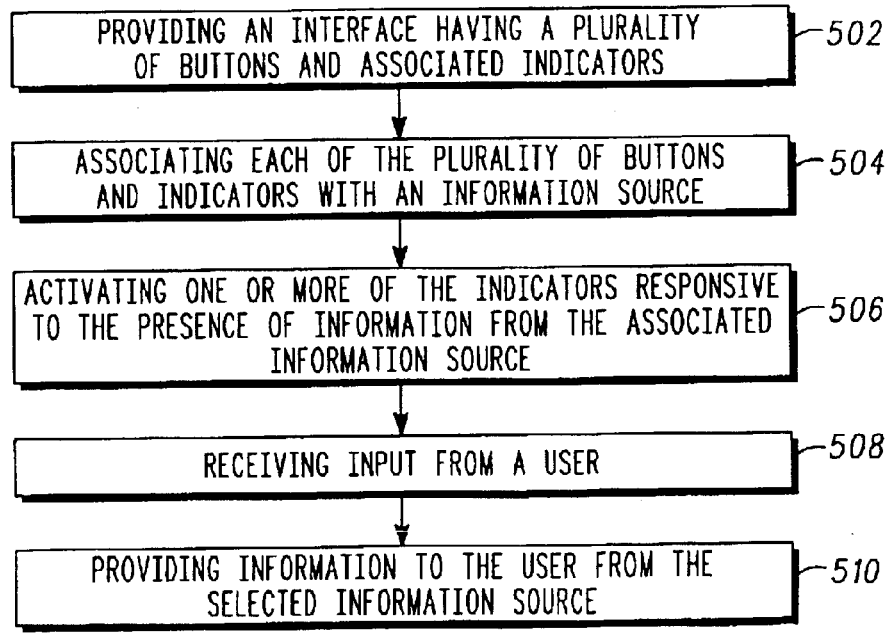
FIG. 5 is a flowchart depicting a method according to an exemplary embodiment.

FIG. 5 illustrates a method 500 of managing information. The method 500 begins at step 502 by providing an interface having a plurality of buttons and associated indicators. At step 504, each of the plurality of buttons and associated indicators are associated with an information source. The indicators are activated in one of a plurality of possible states based upon the presence of information received from the associated information source at step 506. Input is received from the user pressing one of the buttons at step 508, and at step 510, the information associated with the button and indicator is provided to the user.

Referring now to FIG. 6, an interface 600 is illustrated disposed in an upper surface 602 of a hub 604 of a steering wheel 606. The interface 600 is disposed in the upper opening 608 of the steering wheel 606. The upper opening 608 typically provides the vehicle driver with a view of the instrument panel, and the interface is conveniently within the driver's vision during glances at the instrument panel.

The interface 600 includes a base 610 and a plurality of switch caps, three of which are shown as switch caps 612, 614 and 616. Each switch cap has a first substantially vertical surface 620, 622 and 624, respectively, relative to a front surface 626 of the steering wheel hub 604. Each switch cap also has a surface 628, 630 and 632, respectively that has a downward slope relative to the top surface 634 away from the driver. Disposed on the first surfaces 620–624 are graphics indicators, i.e., icons, associated with an information function tied to the respective switch. For example, a phone icon is used to indicate that the switch 620 is tied to a communications function within the vehicle, as described more completely above. The horizontal surfaces 628–632 may be formed with a concave contour, and the entire switch may have a suitably textured surface that is both pleasing to the touch and that limits slipping of a drivers fingers from the switches.

The switch caps 612–616 may be spaced such that they generally correspond in spacing to the spacing of an average or selected percentile vehicle driver's index, middle and ring fingers. Other spacing or even arbitrary spacing may be employed.

Referring to FIGS. 6 and 7, the base 610 formed with apertures 638, 640 and 642 corresponding to each of the switch caps 612, 614 and 616. The switch cap 612–616 extends through its respective aperture 638–642, and is pivotably secured to the base 610. In that regard, the base is formed with hinge pivots, one shown as hinge pivot 644 (FIGS. 7 and 8), adjacent the apertures. The switch caps 612–616 are formed with apertures (apertures 646 in shown in FIGS. 7 and 9) into which the hinge pivots 644 are received for pivotably mounting the switch cap 612–616 to the base 610. A flange 648 is formed on the switch cap 612–616 and engages a surface 650 to retain the switch cap 616–616 in its respective aperture 638–642.

The base 610 is formed with flanges 652 and 654 for securing the base 610, and hence the interface 600, to the steering wheel hub 604. The flanges 652 and 654 may be formed with flexible tabs, ribs or the like (not depicted), as is well known in the art, for locking the interface 600 into an aperture (not depicted) in the steering wheel hub 604.

The base 610 further defines a cavity 656 beneath the switch caps 612–616 sized to receive a printed circuit board 658 or portion thereof onto which are disposed light emitting diodes (LEDs) 660, 662 and 664 and momentary contact switches 666, 668 and 670, corresponding respectively with the switch caps 612, 614 and 616. The printed circuit board 658 includes conductive traces 672 that couple the LEDs and momentary contact switches to a control device, such as the sensor fusion module 30 (FIG. 1). Each switch cap 612–616 is formed with a dowel structure, one shown as dowel 674 in FIGS. 8 and 9, for engaging the corresponding momentary contact switch. The momentary contact switches 666–670 may have a resiliency that supports the switch caps 612–616 in a normally open position with the flange 648 engaged with the surface 650. A spring bias may also be provided.

The interface 600 may operate as described above in connection with a control device, sensor fusion module (e.g., sensor fusion module 30) or other suitable information source to present to the driver indications relating to the availability of particular pieces of information. The driver may then respond to the indications by actuating, i.e., applying pressure, to the corresponding switch cap 612–616 to close the corresponding momentary contact switch 666–670. The closing of the momentary contact switch 666–670 acknowledges the availability of the information and causes the available information to be communicated to the driver. As shown in FIG. 8, the switch caps 612–616 are configured to have a smooth rocking motion of small angular displacement away from the driver such that pressure either on the vertical surface 620–624 or the surface 626–630 causes closing of the corresponding momentary contact switch 666–670 and actuation of the interface 600. The required actuation pressure may be selected according human factors consideration as is well known in the art. Moreover, the arrangement of the three switches themselves provides a tactile indication to the driver such that the driver is aware of which switch is being pressed. Still, additional tactile indications, such as a small bump on the middle switch cap, 614, may be included to assist the driver. Additionally, while three switches are shown, more or less than three switches may be used. Also, while the interface 600 is shown disposed on the steering wheel hub 604, it will be appreciated that the interface 600 may be disposed elsewhere in the vehicle, such as on the instrument panel, center console and the like.

This application described several specific embodiments. However, one of ordinary skill in the art will appreciate that various modifications and changes can be made to these embodiments. Accordingly, the specification and drawings are to be regarded in an illustrative rather than restrictive sense, and all such modifications are intended to be included within the scope of the present patent.

We claim:

1. An interface for managing information within a vehicle comprising:

a vehicle steering wheel having a hub, a rim and a plurality of spokes, the hub, rim and a portion of the spokes defining an opening facilitating viewing of an instrument cluster disposed within the vehicle by the driver;

a base including locking flanges for securing the base to at least one of the hub, the rim and the spokes, the base formed to include a plurality of apertures for receiving a switch cap, a hinge pivot adjacent the aperture and a cavity for receiving a printed circuit board;

a switch cap extending through each of the plurality of apertures, each switch cap formed to include an aperture for engaging a corresponding hinge pivot and pivotably supporting the switch cap within the housing with a surface of the switch cap extending outwardly from the base, the switch cap further formed with a dowel structure arranged to engage a momentary contact switch disposed on the printed circuit board;

each switch cap surface having a first surface and a second surface such that pressure applied to one of the first surface and the second surface causes limited rocking motion of the switch cap and corresponding engagement of the dowel with a corresponding momentary contact switch for closing the momentary contact switch and hence actuating the momentary contract switch;

each switch cap having an information indicator associated therewith, the information indicator being associated with a source of information;

each information indicator having a plurality of states, wherein each state of the information indicator is indicative of a presence of information from the associated source of information and a characteristic of the information;

wherein actuation of each momentary contact switch is operable to cause a dissemination of the information from the source of information associated with the indicator depicted on the corresponding switch cap and wherein the information indicators extend into the opening.

2. The interface of claim 1, wherein the base is secured to the hub on an upper surface of the hub and such that the information indicators extend into a lower portion of the opening.

3. The interface of claim 1, wherein each information indicator is formed on a corresponding one the first surface and the second surface of the switch caps.

4. The interface of claim 1, wherein each switch cap is accessible by the driver while grasping the steering wheel.

5. The interface of claim 1, wherein the information indicators are substantially in the driver's line of sight while operating the vehicle.

6. The interface of claim 1, wherein each switch cap is located substantially adjacent to at least one other switch cap.

7. The interface of claim 6, wherein each information indicator comprises a visual indicator having at least three states.

8. The interface of claim 7, wherein the at least three states comprise: inactive, steadily indicated and flashed.

9. The interface of claim 6, wherein the source of information comprises at least one source of information form the group comprising: wireless communication information, navigation information, vehicle operation information.

10. The interface of claim 6, wherein the interface is disposed within a vehicle, and wherein the source of information is operably coupled from the vehicle to the interface.

11. The interface of claim 6, wherein the interface comprises one of: a cellular telephone, a pager and a personal digital assistant.

12. The interface of claim 6, wherein each of the switch caps are disposed in proximity to each other.

13. The interface of claim 6, an icon disposed on one of the first vertical surface and the second surface of each switch cap.

14. The interface of claim 13, each switch cap being formed to permit back illumination of the icon.

15. The interface of claim 6, wherein at least one of the first surface and the second surface being formed with a contour to provide haptic feedback that the user has engaged the switch cap.

16. Within a vehicle having a steering wheel with a hub, a rim and a plurality of spokes, the hub, rim and a portion of the plurality of spokes defining an opening facilitating viewing of an instrument cluster disposed within the vehicle by the driver and a plurality of sources of information to be communicated to the driver, an interface for managing communication of information from the plurality of sources to the driver, the interface comprising:
- a base including locking flanges for securing the base to one of the hub, the rim and the portion of the plurality of spokes and within the driver's primary line of sight while operating the vehicle, the base formed to include a plurality of apertures for receiving a switch cap, a hinge pivot adjacent the aperture and a cavity for receiving a printed circuit board;
- a switch cap extending through each of the plurality of apertures, each switch cap formed to include an aperture for engaging a corresponding hinge pivot and pivotably supporting the switch cap within the housing with a surface of the switch cap extending outwardly from the base, the switch cap further formed with a dowel structure arranged to engage a momentary contact switch disposed on the printed circuit board;
- each switch cap surface having a first surface and a second surface such that pressure applied to one of the first surface and the second surface causes limited rocking motion of the switch cap and corresponding engagement of the dowel with a corresponding momentary contact switch for closing the momentary contact switch and hence actuating the momentary contract switch;
- each switch cap having an status indicator associated therewith, the status indicator being associated with a source of information;
- each status indicator having a plurality of states, wherein each state of the status indicator is indicative of a presence of information from the source of information and a characteristic of the information; and
- wherein actuation of a momentary contact switch causes dissemination of the information from the associated source of information.

17. The interface of claim 16, wherein the interface is located within the opening of the steering wheel on a surface of the hub defining the opening.

18. The interface of claim 17, wherein the surface of the hub is a top surface of the hub relative to the driver.

19. The interface of claim 16, wherein each indicator comprises a visual indicator having at least three states.

20. The interface of claim 16, wherein the source of information comprises at least one source of information form the group comprising: wireless communication information, navigation information, vehicle operation information.

* * * * *